United States Patent Office 3,689,376
Patented Sept. 5, 1972

3,689,376
PROCESS FOR SEPARATING HALOGENATED HYDROCARBONS FROM A HALOGENATED HYDROCARBON-ACETONE MIXTURE BY WATER EXTRACTIVE DISTILLATION
William M. Hutchinson, Bartlesville, Okla., assignor to Phillips Petroleum Company
No Drawing. Filed May 10, 1971, Ser. No. 141,951
Int. Cl. C07c 17/38
U.S. Cl. 203—95                      3 Claims

ABSTRACT OF THE DISCLOSURE

A process for separating halogenated hydrocarbons from a halogenated hydrocarbon-acetone first mixture by adding water to the first mixture to form a second mixture, and extractively distilling the second mixture in an extractive distillation zone.

---

This invention relates to the separation of halogenated hydrocarbons from a first mixture of halogenated hydrocarbons and acetone and, more particularly, to a process for separating 1-chloro-1,2,2-trifluoroethane and 1,2-dichloro-1,1-difluoroethane from a first mixture of 1-chloro-1,2,2-trifluoroethane and acetone or 1,2-dichloro-1,1-difluoroethane and acetone.

In order to simplify the description of this process, 1-chloro-1,2,2-trifluoroethane is hereafter referred to as 133 and 1,2-dichloro-1,1-difluoroethane is hereafter referred to as 132b.

In various hydrocarbon processes, as known in the art, 133 and 132b are present in a fluid mixture with acetone. This is the result of, for example, having separated said 133 and 132b from admixture with other close-boiling halogenated hydrocarbons by extractive distillation using acetone as the volatility-modifying agent. It sometimes then becomes necessary to separate the halogenated hydrocarbon from the acetone for recovery of the valuable hydrocarbon and to recover the acetone for recycle. One source of such halogenated hydrocarbons is the electrochemical fluorination of ethylene dichloride.

It has been found, surprisingly, that when water is added to a first mixture of 133 and acetone or to 132b and acetone in a selected ratio range, the resultant second mixtures can be heated in an extractive distillation zone and 133 or 132b can be separated and removed in substantially a pure form from said second mixtures. The quantity of water to be added can be varied over a wide range. Even the addition of small quantities of water significantly promotes separation of the substantially pure 133 and 132b components. For example, in the extractive distillation of 133 by the process of this invention, the amount of water utilized to form the resultant second mixture can be varied over a ratio range of about 0.5 to about 100 parts by weight of water for each part by weight of acetone in the first mixture. The ranges of water addition that are preferred in order to maintain the total liquid volumes to a minimum is about 1 to about 4 parts by weight of water to each part by weight of acetone in said first mixture. In the extractive distillation of 132b by the process of this invention, the amount of water utilized to form the resultant second mixture can be varied over a ratio range of about 0.01 to about 100 parts by weight of water for each part by weight of acetone in the first mixture. The ranges of water additions that are preferred in order to maintain the total liquid volumes to a minimum are about 0.1 to about 10 parts by weight of water to each part by weight of acetone in said first mixture.

At lower water addition from the ranges set forth above, the temperatures of extractive distillation are sufficiently critical to lower the efficiency of the process and at water additions greater than the above ranges, the total fluid volume is sufficiently great to lower the efficiency owing to the excessive volume of the second mixture that must be extractively distilled.

In their pure state, the constituents of interest have boiling points at atmospheric pressure as follows:

| Constituent: | Boiling point temperature, ° C. |
|---|---|
| 133 | 17 |
| 132b | 46.8 |
| Acetone | 56.2 |

In a first mixture of 133 and acetone, for example, 133 with a boiling point of 17° C. is first to boil off as a vapor from the first mixture during distillation thereof. Owing to the low value of the relative volatility of the components, distillation of the 133 component in a conventional commercial distillation zone results in an overhead product which contains about 4 percent or more acetone. This acetone contamination is undesirable. In order to more effectively separate the components commercially and recover an overhead halogenated hydrocarbon product that is substantially pure, 0.5 to 100 parts by weight of water is added to the first mixture for each part of acetone of said first mixture. First mixtures of 132b and acetone also display the same characteristics and were substantially completely separable when 0.01–100 parts by weight of water for each part by weight of acetone of the first mixture is added to said first mixture.

Examples of the separation by the method of this invention are as follows:

EXAMPLE I

A concentric tube distillation column, sold by Ace Glass Inc. as No. 9219 with a separation efficiency of 40 theoretical stages at a boil-up rate of 80 cc./hr., was employed to study the separation. The column was equipped with a 250-ml., heated flask at the bottom and a condenser with variable take-off head at the top for return of reflux and recovery of overhead product. The column was 13 inches in length and surrounded by a silvered, vacuum jacket. The column was employed to distill a first mixture having a composition comprised of 56 grams of 133 and 31 grams of acetone. Atmospheric pressure (about 750 mm. Hg), 56° C. pot temperature, and an 80/10 reflux ratio was employed for a sufficient time to distill a cut comprising about 6.45 grams of 133 and 0.06 gram or less of acetone as head temperatures of 25–40° C. A rapidly rising head temperature near the end of the cut indicated that acetone began to distill. A composition of the cut was determined by gas-liquid chromatography. The high head temperature at the beginning of the cut (the boiling point of 133 is 17° C.) was apparently due to the low boil-up rate not balancing heat leakage into the distillation head.

This example demonstrates that 133 cannot be separated in substantially a pure form from acetone by an ordinary distillation process.

EXAMPLE II

While 133 can be partially separated from acetone by ordinary distillation, as indicated in Example I, 132b cannot be separated from acetone to any appreciable extent by ordinary distillation. Therefore, the separation of 132b from acetone was investigated more extensively to illustrate my invention.

To the flask of the distillation column of Example I was added 5.4 grams of 132b, 8.7 grams of acetone, and 86.04 grams of water. The distillation column was then operated with a reflux ratio of 5/1 and the following data taken:

| Overhead cut No. | Overhead temperature, °C. | Overhead sample, gram | Overhead composition, weight percent | | |
|---|---|---|---|---|---|
| | | | 132b | Acetone | Water |
| 1 | 43.8 | 0.6 | 99.5 | 0.5 | <0.05 |
| 2 | 43.8 | 0.6 | +99.9 | 0.03 | 0.03 |
| 3 | 43.8 | 0.6 | +99.9 | <0.01 | 0.03 |

The above data indicate the ease of separation of 132b from acetone in the presence of water. In another test, 133 was also separated from acetone by distillation in the presence of water.

Other modifications and alterations of this invention will become apparent to those skilled in the art from the foregoing discussion and examples and it should be understood that this invention is not to be unduly limited thereto.

What is claimed is:

1. A process for separating 1-chloro-1,2,2-trifluoroethane from a first mixture of 1-chloro-1,2,2-trifluoroethane and acetone, comprising:
    adding water to said first mixture of 1-chloro-1,2,2-trifluoroethane and acetone at a ratio in the range of about 0.5 to about 100 parts by weight of water to each part by weight of acetone in the first mixture to form a second mixture; and
    separating the 1-chloro-1,2,2-trifluoroethane from the acetone of said second mixture by extractively distilling the second mixture in an extractive distillation zone.

2. A process, as set forth in claim 1, wherein the water is added to the first mixture at a ratio in the range of about 1 to about 4 parts by weight of water to each part by weight of acetone in the first mixture.

3. A process for separating 1,2-dichloro-1,1-difluoroethane from a first mixture of 1,2-dichloro-1,1-difluoroethane and acetone, comprising:
    adding water to said first mixture of 1,2-dichloro-1,1-difluoroethane and acetone at a rate in the range of about 10 to about 100 parts by weight of water to each part by weight of acetone in the first mixture to form a second mixture; and
    separating 1,2-dichloro-1,1-difluoroethane from the acetone of said second mixture by extractively distilling the second mixture in an extractive distillation zone.

References Cited

UNITED STATES PATENTS

| 3,321,383 | 5/1967 | Scherer et al. | 203—95 |
| 3,409,513 | 11/1968 | Hamlin | 203—96 |
| 3,620,941 | 11/1971 | Ruehlen | 204—59 R |

WILBUR L. BASCOMB, Jr., Primary Examiner

U.S. Cl. X.R.

260—653 R; 204—59 R